US007081830B2

(12) United States Patent
Shimba et al.

(10) Patent No.: US 7,081,830 B2
(45) Date of Patent: Jul. 25, 2006

(54) HOME ELECTRICAL APPLIANCE CONTROL DEVICE, CONTROL METHOD, CONTROL PROGRAM AND HOME ELECTRICAL APPLIANCE

(75) Inventors: Noriko Shimba, Nara (JP); Sachio Nagamitsu, Kyoto (JP); Norihisa Matsumoto, Moriguchi (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 399 days.

(21) Appl. No.: 10/609,579

(22) Filed: Jul. 1, 2003

(65) Prior Publication Data

US 2004/0002779 A1    Jan. 1, 2004

(30) Foreign Application Priority Data

Jul. 1, 2002    (JP)    ............................. 2002-191776

(51) Int. Cl.
*H04Q 1/00*    (2006.01)
(52) U.S. Cl. .............................. 340/825.62; 340/825.22
(58) Field of Classification Search ........... 340/825.62, 340/825.22, 825.24, 825.25, 3.7, 3.71; 700/90
See application file for complete search history.

(56) References Cited

U.S. PATENT DOCUMENTS 5,107,256 A * 4/1992 Ueno et al. ............ 340/825.52
5,420,573 A * 5/1995 Tanaka et al. ......... 340/825.24
5,621,659 A * 4/1997 Matsumoto et al. .......... 710/10
5,959,539 A    9/1999 Adolph et al.
6,133,847 A * 10/2000 Yang ..................... 340/825.22

FOREIGN PATENT DOCUMENTS

CN    1159686    9/1997

OTHER PUBLICATIONS

"A Method for AMIDEN Architecture, Ver. 1" published on Mar. 20, 2002 by AMIDEN Laboratory, Laboratories of Image Information Science and Technology, pp. 5, 9, 18, 21, 22, and 137.

* cited by examiner

*Primary Examiner*—Edwin C. Holloway, III
(74) *Attorney, Agent, or Firm*—Wenderoth, Lind & Ponack, L.L.P.

(57)    ABSTRACT

The present invention provides a control device that controls home electrical appliances via a communication line by using function codes which are set without being specialized for specific home electrical appliances. In particular, the present invention provides a home electrical appliance control device that controls a home electrical appliance connected via a communication line, where the device includes: a memory section for storing a function table for mapping function identifiers, which identify function types allocated with the focus on the function itself to functions with which the home electrical appliance is equipped, with attributes of the functions, and a control section for controlling the home electrical appliance via the communication line based on the function table.

11 Claims, 18 Drawing Sheets

FIG. 4

EXAMPLE OF FUNCTION TABLE OF THE PRESENT EMBODIMENT

| FUNCTION CODE | FUNCTION NAME | FUNCTION DESCRIPTION | DATA TYPE | SIZE | VALUE RANGE |
|---|---|---|---|---|---|
| 01 | DEVICE OPERATION SETTING | DEVICE OPERATION ON/OFF SETTING | unsigned char | 1byte | 0:OFF,1:ON |
| 02 | VENTILATION AMOUNT SETTING | VENTED AIR AMOUNT LEVEL SETTING | unsigned char | 1byte | 0:OFF,1~10:10 STAGE VENTED AIR AMOUNT LEVEL, 0×FF:AUTOMATIC |
| 03 | VENTED AIR TEMPERATURE SETTING | VENTED AIR TEMPERATURE SETTING (°C) | unsigned char | 1byte | 0:OFF,0~30 |
| 04 | VENTED AIR DIRECTION SETTING | VENTED AIR DIRECTIONAL SWING SETTING | unsigned char | 1byte | 0:OFF,1:UP AND DOWN, 2:LEFT AND RIGHT, 3:UP AND DOWN |
| 05 | AIR PURIFICATION SETTING | OPERATION SETTING OF AIR PURIFICATION FUNCTION | unsigned char | 1byte | 0:OFF,1:ON |
| 06 | CLEANING LEVEL | CLEANING LEVEL | unsigned char | 1byte | 0:OFF,1~5:5 STAGE CLEANING LEVEL,0×FF:AUTOMATIC |
| 07 | SMOKE DETECTION STATE | SMOKE DETECTION STATE | unsigned char | 1byte | 0:OFF,1:ON |
| 08 | CURRENT TIME SETTING | CURRENT TIME SETTING | unsigned char | 2byte | 0~23(HOURS),0~59(MINUTES) |
| 09 | ON TIMER SETTING | TIME SETTING FOR ON OPERATION | unsigned char | 2byte | 0~23(HOURS),0~59(MINUTES) 0×FFFF:OFF |
| 10 | OFF TIMER SETTING | TIME SETTING FOR OFF OPERATION | unsigned char | 2byte | 0~23(HOURS),0~59(MINUTES) 0×FFFF:OFF |
| ... | ... | ... | ... | ... | ... |

FIG. 5A

BUILT-IN FUNCTION TABLE FOR AIR CONDITIONER 40-1

| FUNCTION CODE 41 | FUNCTION NAME 42 | FUNCTION DESCRIPTION 43 | DATA TYPE 44 | SIZE 45 | VALUE RANGE 46 | ACCESS INFORMATION 47 |
|---|---|---|---|---|---|---|
| 01 | DEVICE OPERATION SETTING | DEVICE OPERATION ON/OFF SETTING | unsigned char | 1byte | 0:OFF, 1:ON | GET |
| 02 | VENTILATION AMOUNT SETTING | VENTED AIR AMOUNT LEVEL SETTING | unsigned char | 1byte | 0:OFF, 1～10: 10 STAGE VENTED AIR AMOUNT LEVEL, 0×FF:AUTOMATIC | SET |
| 03 | VENTED AIR TEMPERATURE SETTING | VENTED AIR TEMPERATURE SETTING (°C) | unsigned char | 1byte | 0:OFF, 0～30 | SET |
| 04 | VENTED AIR DIRECTION SETTING | VENTED AIR DIRECTIONAL SWING SETTING | unsigned char | 1byte | 0:OFF, 1:UP AND DOWN, 2: LEFT AND RIGHT, 3:UP AND DOWN, LEFT AND RIGHT | GET |
| 05 | AIR PURIFICATION SETTING | OPERATION SETTING OF AIR PURIFICATION FUNCTION | unsigned char | 1byte | 0:OFF, 1:ON | SET |
| 08 | CURRENT TIME SETTING | CURRENT TIME SETTING | unsigned char | 2byte | 0～23(HOURS), 0～59(MINUTES) | SET |
| 09 | ON TIMER SETTING | TIME SETTING FOR ON OPERATION | unsigned char | 2byte | 0～23(HOURS), 0～59(MINUTES) 0×FFFF:OFF | SET |
| 10 | OFF TIMER SETTING | TIME SETTING FOR OFF OPERATION | unsigned char | 2byte | 0～23(HOURS), 0～59(MINUTES) 0×FFFF:OFF | SET |

FIG. 5B

BUILT-IN FUNCTION TABLE FOR ELECTRIC FAN 40-2

| FUNCTION CODE 41 | FUNCTION NAME 42 | FUNCTION DESCRIPTION 43 | DATA TYPE 44 | SIZE 45 | VALUE RANGE 46 | ACCESS INFORMATION 47 |
|---|---|---|---|---|---|---|
| 01 | DEVICE OPERATION SETTING | DEVICE OPERATION ON/OFF SETTING | unsigned char | 1byte | 0:OFF,1:ON | SET |
| 02 | VENTILATION AMOUNT SETTING | VENTED AIR AMOUNT LEVEL SETTING | unsigned char | 1byte | 0:OFF, 1~10: 10 STAGE VENTED AIR AMOUNT LEVEL, 0xFF:AUTOMATIC | SET |
| 04 | VENTED AIR DIRECTION SETTING | VENTED AIR DIRECTIONAL SWING SETTING | unsigned char | 1byte | 0:OFF, 1:UP AND DOWN, 2: LEFT AND RIGHT, 3: UP AND DOWN, LEFT AND RIGHT | SET |
| 08 | CURRENT TIME SETTING | CURRENT TIME SETTING | unsigned char | 2byte | 0~23(HOURS), 0~59(MINUTES) | SET |
| 09 | ON TIMER SETTING | TIME SETTING FOR ON OPERATION | unsigned char | 2byte | 0~23(HOURS), 0~59(MINUTES), 0xFFFF:OFF | SET |
| 10 | OFF TIMER SETTING | TIME SETTING FOR OFF OPERATION | unsigned char | 2byte | 0~23(HOURS), 0~59(MINUTES), 0xFFFF:OFF | SET |

FIG. 5C

BUILT-IN FUNCTION TABLE FOR CLEANER 40-3

| FUNCTION CODE 41 | FUNCTION NAME 42 | FUNCTION DESCRIPTION 43 | DATA TYPE 44 | SIZE 45 | VALUE RANGE 46 | ACCESS INFORMATION 47 |
|---|---|---|---|---|---|---|
| 01 | DEVICE OPERATION SETTING | DEVICE OPERATION ON/OFF SETTING | unsigned char | 1byte | 0:OFF,1:ON | SET |
| 06 | CLEANING LEVEL | CLEANING LEVEL | unsigned char | 1byte | 1~5: 5 STAGE CLEANING LEVEL, 0xFF: AUTOMATIC | GET |

FIG. 5D

BUILT-IN FUNCTION TABLE FOR SMOKE DETECTOR 40-4

| FUNCTION CODE 41 | FUNCTION NAME 42 | FUNCTION DESCRIPTION 43 | DATA TYPE 44 | SIZE 45 | VALUE RANGE 46 | ACCESS INFORMATION 47 |
|---|---|---|---|---|---|---|
| 01 | DEVICE OPERATION SETTING | DEVICE OPERATION ON/OFF SETTING | unsigned char | 1byte | 0:OFF,1:ON | SET |
| 07 | SMOKE DETECTION STATE | SMOKE DETECTION STATE | unsigned char | 1byte | 0:OFF,1:ON | ANNOUNCE |

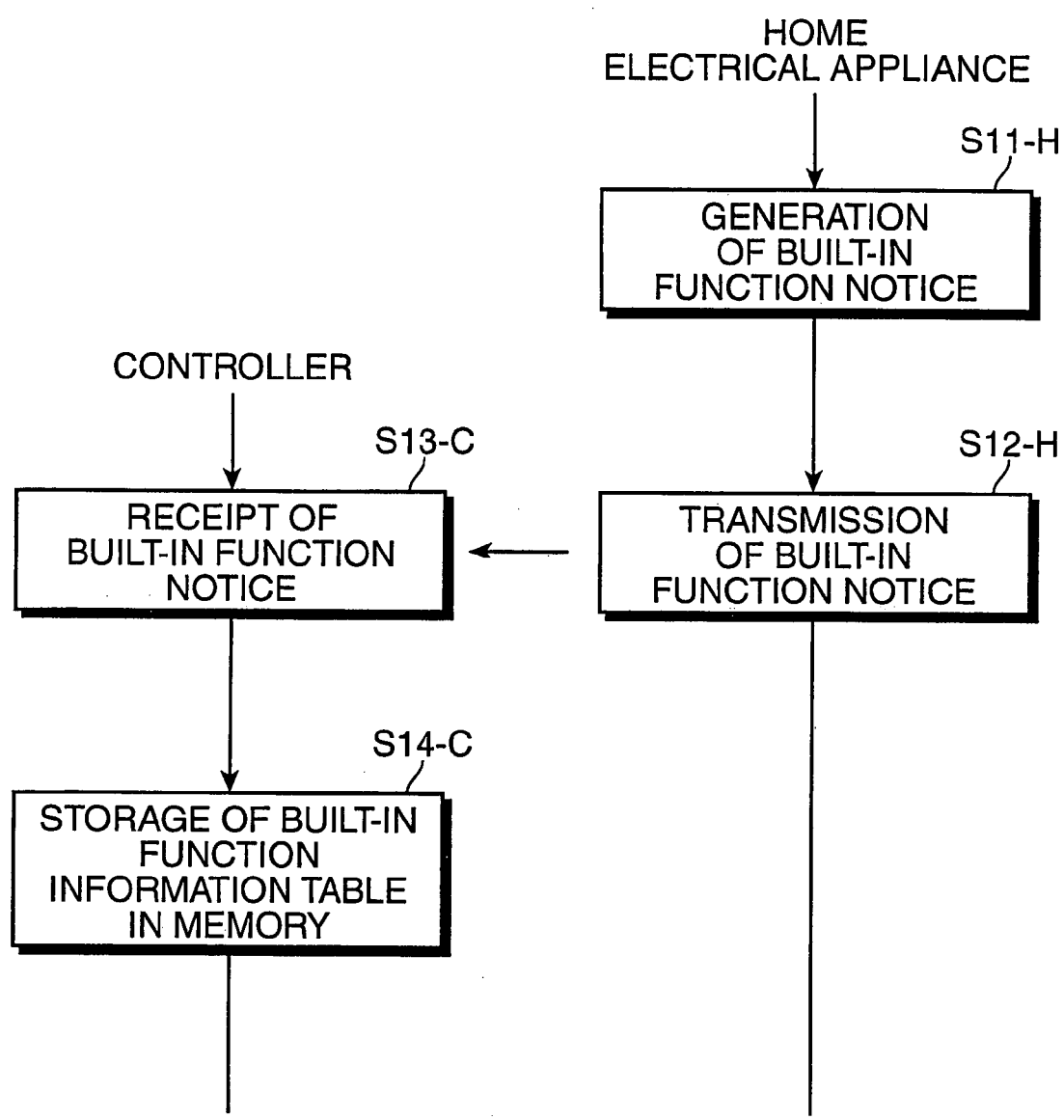

FIG. 7A

BUILT-IN FUNCTION INFORMATION TABLE FOR AIR CONDITIONER

| IDENTIFICATION INFORMATION | HOME NETWORK ADDRESS OF AIR CONDITIONER |
|---|---|
| FUNCTION CODE | ACCESS INFORMATION |
| 01 | GET |
| 02 | SET |
| 03 | SET |
| 04 | GET |
| 05 | SET |
| 08 | SET |
| 09 | SET |
| 10 | SET |

FIG. 7B

BUILT-IN FUNCTION INFORMATION TABLE FOR ELECTRIC FAN

| IDENTIFICATION INFORMATION | HOME NETWORK ADDRESS OF ELECTRIC FAN |
|---|---|
| FUNCTION CODE | ACCESS INFORMATION |
| 01 | SET |
| 02 | SET |
| 04 | SET |
| 08 | SET |
| 09 | SET |
| 10 | SET |

FIG. 7C

BUILT-IN FUNCTION INFORMATION TABLE FOR CLEANER

| IDENTIFICATION INFORMATION | HOME NETWORK ADDRESS OF CLEANER |
|---|---|
| FUNCTION CODE | ACCESS INFORMATION |
| 01 | SET |
| 06 | GET |

FIG. 7D

BUILT-IN FUNCTION INFORMATION TABLE FOR SMOKE DETECTOR

| IDENTIFICATION INFORMATION | HOME NETWORK ADDRESS OF SMOKE DETECTOR |
|---|---|
| FUNCTION CODE | ACCESS INFORMATION |
| 01 | SET |
| 07 | ANNOUNCE |

FIG. 11

BUILT-IN FUNCTION TABLE FOR AIR CONDITIONER EQUIPPED WITH SMOKE DETECTOR 40-5

| FUNCTION CODE | FUNCTION NAME | FUNCTION DESCRIPTION | DATA TYPE | SIZE | VALUE RANGE | ACCESS INFORMATION |
|---|---|---|---|---|---|---|
| 01 | DEVICE OPERATION SETTING | DEVICE OPERATION ON/OFF SETTING | unsigned char | 1byte | 0:OFF;1:ON | GET |
| 02 | VENTILATION AMOUNT SETTING | VENTED AIR AMOUNT LEVEL SETTING | unsigned char | 1byte | 0:OFF, 1~10:10 STAGE VENTED AIR AMOUNT LEVEL, 0×FF:AUTOMATIC | SET |
| 03 | VENTED AIR TEMPERATURE SETTING | VENTED AIR TEMPERATURE SETTING (°C) | unsigned char | 1byte | 0:OFF,0~30 | SET |
| 04 | VENTED AIR DIRECTION SETTING | VENTED AIR DIRECTIONAL SWING SETTING | unsigned char | 1byte | 0:OFF, 1:UP AND DOWN, 2:LEFT AND RIGHT, 3:UP AND DOWN, LEFT AND RIGHT | GET |
| 05 | AIR PURIFICATION SETTING | OPERATION SETTING OF AIR PURIFICATION FUNCTION | unsigned char | 1byte | 0:OFF;1:ON | SET |
| 07 | SMOKE DETECTION STATE | SMOKE DETECTION STATE | unsigned char | 1byte | 0:OFF;1:ON | ANNOUNCE |
| 08 | CURRENT TIME SETTING | CURRENT TIME SETTING | unsigned char | 2byte | 0~23(HOURS) 0~59(MINUTES) | SET |
| 09 | ON TIMER SETTING | TIME SETTING FOR ON OPERATION | unsigned char | 2byte | 0~23(HOURS) 0~59(MINUTES),0×FFFF:OFF | SET |
| 10 | OFF TIMER SETTING | TIME SETTING FOR OFF OPERATION | unsigned char | 2byte | 0~23(HOURS) 0~59(MINUTES),0×FFFF:OFF | SET |

FIG.12

BUILT-IN FUNCTION TABLE FOR AIR CLEANER                                     40-6

| FUNCTION CODE | FUNCTION NAME | FUNCTION DESCRIPTION | DATA TYPE | SIZE | VALUE RANGE | ACCESS INFORMATION |
|---|---|---|---|---|---|---|
| 01 | DEVICE OPERATION SETTING | DEVICE OPERATION ON/OFF SETTING | unsigned char | 1 byte | 0:OFF,1:ON | SET |
| 05 | AIR PURIFICATION SETTING | OPERATION SETTING OF AIR PURIFICATION FUNCTION | unsigned char | 1 byte | 0:OFF,1:ON | SET |
| 06 | CLEANING LEVEL | CLEANING LEVEL | unsigned char | 1 byte | 1~5:5 STAGE LEVEL 0×FF :AUTOMATIC | GET |

| DEVICE CODE | DEVICE NAME |
|---|---|
| 01 | AIR CONDITIONER |
| 02 | ELECTRIC FAN |
| 03 | CLEANER |
| 04 | SMOKE DETECTOR |
| ... | ... |

FIG. 15A

BUILT-IN FUNCTION TABLE FOR AIR CONDITIONER — 160

| FUNCTION CODE 161 | FUNCTION NAME 162 | FUNCTION DESCRIPTION 163 | DATA TYPE 164 | SIZE 165 | VALUE RANGE 166 |
|---|---|---|---|---|---|
| 10 | DEVICE OPERATION SETTING | DEVICE OPERATION ON/OFF SETTING | unsigned char | 1byte | 0:OFF, 1:ON |
| 11 | VENTILATION AMOUNT SETTING | VENTED AIR AMOUNT LEVEL SETTING | unsigned char | 1byte | 0:OFF, 1~10:10 STAGE VENTED AIR AMOUNT LEVEL, 0×FF:AUTOMATIC |
| 12 | VENTED AIR TEMPERATURE SETTING | VENTED AIR TEMPERATURE SETTING (°C) | unsigned char | 1byte | 0~30, 0×FF:AUTOMATIC |
| 13 | VENTED AIR DIRECTION SETTING | VENTED AIR DIRECTIONAL SWING SETTING | unsigned char | 1byte | 0:OFF, 1:UP AND DOWN, 2:LEFT AND RIGHT, 3:UP AND DOWN, LEFT AND RIGHT |
| 14 | AIR PURIFICATION SETTING | OPERATION SETTING OF AIR PURIFICATION FUNCTION | unsigned char | 1byte | 0:OFF, 1:ON |
| 15 | CURRENT TIME SETTING | CURRENT TIME SETTING | unsigned char | 2byte | 0~23(HOURS), 0~59(MINUTES) |
| 16 | ON TIMER SETTING | TIME SETTING FOR ON OPERATION | unsigned char | 2byte | 0~23(HOURS), 0~59(MINUTES) |
| 17 | OFF TIMER SETTING | TIME SETTING FOR OFF OPERATION | unsigned char | 2byte | 0~23(HOURS), 0~59(MINUTES) |

FIG. 15B

BUILT-IN FUNCTION TABLE FOR ELECTRIC FAN

| FUNCTION CODE | FUNCTION NAME | FUNCTION DESCRIPTION | DATA TYPE | SIZE | VALUE RANGE |
|---|---|---|---|---|---|
| 10 | DEVICE OPERATION SETTING | DEVICE OPERATION ON/OFF SETTING | unsigned char | 1byte | 0:OFF,1:ON |
| 11 | VENTILATION AMOUNT SETTING | VENTED AIR AMOUNT LEVEL SETTING | unsigned char | 1byte | 0:OFF, 1~10:10 STAGE VENTED AIR AMOUNT LEVEL, 0×FF:AUTOMATIC |
| 12 | VENTED AIR DIRECTION SETTING | VENTED AIR DIRECTIONAL SWING SETTING | unsigned char | 1byte | 0:OFF, 1:UP AND DOWN, 2: LEFT AND RIGHT, 3: UP AND DOWN, LEFT AND RIGHT |
| 13 | CURRENT TIME SETTING | CURRENT TIME SETTING | unsigned char | 2byte | 0~23(HOURS), 0~59(MINUTES) |
| 14 | ON TIMER SETTING | TIME SETTING FOR ON OPERATION | unsigned char | 2byte | 0~23(HOURS), 0~59(MINUTES) |
| 15 | OFF TIMER SETTING | TIME SETTING FOR OFF OPERATION | unsigned char | 2byte | 0~23(HOURS), 0~59(MINUTES) |

FIG. 15C

BUILT-IN FUNCTION TABLE FOR CLEANER

| FUNCTION CODE | FUNCTION NAME | FUNCTION DESCRIPTION | DATA TYPE | SIZE | VALUE RANGE |
|---|---|---|---|---|---|
| 10 | DEVICE OPERATION SETTING | DEVICE OPERATION ON/OFF SETTING | unsigned char | 1byte | 0:OFF,1:ON |
| 11 | CLEANING LEVEL | CLEANING LEVEL | unsigned char | 1byte | 1~5: 5 STAGE CLEANING LEVEL, 0XFF: AUTOMATIC |

FIG. 15D

BUILT-IN FUNCTION TABLE FOR SMOKE DETECTOR

| FUNCTION CODE | FUNCTION NAME | FUNCTION DESCRIPTION | DATA TYPE | SIZE | VALUE RANGE |
|---|---|---|---|---|---|
| 10 | DEVICE OPERATION SETTING | DEVICE OPERATION ON/OFF SETTING | unsigned char | 1byte | 0:OFF,1:ON |
| 11 | SMOKE DETECTION STATE | SMOKE DETECTION STATE | unsigned char | 1byte | 0:OFF,1:ON |

HOME ELECTRICAL APPLIANCE CONTROL DEVICE, CONTROL METHOD, CONTROL PROGRAM AND HOME ELECTRICAL APPLIANCE

BACKGROUND OF THE INVENTION

1. Field of the Invention

The present invention relates to a control device, control method and control program that control home electrical appliances via a communication line. Further, the present invention relates to a home electrical appliance which is controlled by the control device via the communication line.

2. Description of the Related Art

While, on the one hand, the environment of households of the twenty-first century is affected by a variety of problems such as the development of global environmental problems, a dwindling birthrate and an aging population, and so forth, the opportunities for forging links between the household and society (outside the home) are increasing as information communication infrastructures rapidly develop. Therefore, services which result from links with society and which are safe, comfortable and take the global environment into consideration are surely a requirement for households of the twenty-first century.

In order to adapt to such circumstances, recent years have witnessed the development of home network systems such as the home bus standard HBS, and ECHONET, and so forth. These home network systems are systems that form home networks connecting a variety of home electrical appliances, home equipment, and control devices within the home to one another via a communication network formed by a domestic communication line, causing these elements to operate efficiently in co-operation with one another. Thus, home networks and external networks are connected to one another and the operation of home electrical appliances is instructed via external terminals, whereby it is possible to comply with energy conservation and adapt to the dwindling birthrate and aging population and to provide a safe and comfortable life. Furthermore, in this specification, electrical goods that are capable of a connection to a home network which include not only so-called household appliances (home electrical appliances in the narrow sense of the word) but also sensors for measuring and sensing home equipment and the home environment, and so forth are collectively referred to as 'home electrical appliances' (home electrical appliances in a broader sense of the word).

In FIG. 13, a conventional home network system is constituted as comprising a server 111 for providing a service using the Internet, a home network 114, and an external communication line 112 for connecting the server 111 and the home network 114 to one another. The home network 114 is constituted as comprising a home gateway 121 constituting an interface with the external communication line 112, a controller 122 for controlling operating states of each home electrical appliance 123, home electrical appliances 123 (such as an air conditioner 123-1, an electric fan 123-2, a cleaner 123-3, and a smoke detector 123-4, for example), and a domestic communication line 124 for connecting the home gateway 121, the controller 122, and the home electrical appliances 123 to one another.

In addition, the controller 122 is charged with controlling the operation of the home electrical appliances 123 and stores a device code table 150 in a memory (not shown) which the controller 122 comprises. In FIG. 14, the device code table 150 is a table that maps a device code 151 which is an identifier that identifies the type of home electrical appliance 123 allocated to each home electrical appliance 123, and a device name 152 that indicates the name of the home electrical appliance 123 corresponding to the device code 151.

Further, each home electrical appliance 123 is charged with interpreting control signals that are received from the controller 122 and other home electrical appliances 123 and so forth, and stores a built-in function table 160 in a memory (not shown) which the home electrical appliance 123 comprises, as well as the device code 151 which pertains to the home electrical appliance 123. In addition, a home network address that uniquely identifies the home electrical appliance 123 within the home network 114 is also stored in the memory. FIGS. 15A–15D show built-in function tables. In particular, FIG. 15A shows the built-in function table of an air conditioner, FIG. 15B shows the built-in function table of an electric fan, FIG. 15C shows the built-in function table of a cleaner, and FIG. 15D shows the built-in function table of a smoke detector. In FIGS. 15A–15D, the built-in function tables 160 are each constituted by a function code 161, which is an identifier that identifies the function types allocated for each of the functions which the home electrical appliance 123 is capable of executing, a function name 162, which indicates the name of the function represented by the function code 161, a function description 163, which is a description of the function executed by the home electrical appliance 123 that corresponds to the function code 161, a data type 164, which indicates the data type of a control description that indicates the state to which the function corresponding to the function code is controlled, a size 165, which indicates the data length of the control description that corresponds to the function code 161, and a value range 166, which is a numerical value range permitting setting of the control description that corresponds to the function code 161. For example, in the case of the air conditioner 123-1, upon referring to the built-in function table 160-1 of the air conditioner, it may be seen that, for the function code 15, the function name 162 is "current time setting", the function description 163 is "function for setting current time", the data type 164 is "unsigned char (character string without numbers)", the size 165 is "2 bytes", and "hours can be set in the range 0 to 23" and "minutes can be set in the range 0 to 59" is set in the value range 166.

In this constitution, the home electrical appliance 123 first references the memory and thus transmits a signal containing the device code 151, function code 161 and home network address which pertain to this home electrical appliance 123 to the controller 122. Upon receiving this signal, the controller 122 creates a connected home electrical appliance function table that indicates the relationship between the home network address, the device code 151 and the function code 161 and then stores this table in memory.

Here, as may be seen from the tables in FIG. 15, although the same function code sometimes represents the same function, generally speaking, the same function code represents different functions depending on the type of home electrical appliance. For example, when the function code=10, this is common for the home electrical appliances 123 and denotes the device operation settings, when the function code=11, this denotes the ventilation amount setting for the air conditioner 123-1 and the electric fan 123-2, denotes the cleaning level for the cleaner 123-3, and denotes the smoke sensing ground state for the smoke detector 123-4.

For this reason, in a case where the controller 122 captures and sets the operating state of a certain function for a certain home electrical appliance 123, and so forth, the controller 122 operates as follows. That is, in a case where the controller 122 captures the operating state of a certain function for a certain home electrical appliance 123, the controller 122 specifies a device code 151 by referencing the device code table 150 on the basis of the device name of a certain home electrical appliance 123 constituting the control target. Next, the controller 122 references a connected home electrical appliance function table and specifies a record which corresponds to the specified device code 151. Then, the controller 122 specifies a home network address from the specified record, and specifies a function code 161 which corresponds to a certain function. The controller 122 then generates a signal that contains information to the effect that the specified home network address, device code 151, function code 161 and function operating state are to be captured, and transmits this signal to the domestic communication line 124. Also, in a case where the controller 122 sets the operating state of a certain function for a certain home electrical appliance 123, the controller 122 specifies the device code 151 by referencing the device code table 150 on the basis of the device name of a certain home electrical appliance 123 constituting the control target. Next, the controller 122 references a connected home electrical appliance function table and specifies a record which corresponds to the specified device code 151. Then, the controller 122 specifies a home network address from the specified record and specifies a function code 161 which corresponds to a certain function. The controller 122 then generates a signal that contains the specified home network address, device code 151, function code 161 and information on the set value of the operating state of the function, and transmits this signal to the domestic communication line 124.

Further, because a function code is allocated to each type of home electrical appliance and to each of the functions of the home electrical appliances 123 as described above, the same function code does not necessarily represent the same function. For this reason, even in a case where the controller 122 executed the same function when controlling the operating state of a home electrical appliance 123, the function code could not previously be specified without first considering the home electrical appliance constituting the control target. Further, in a case where a product produced by adding a new function to a product of an existing type was developed, and in a case where a composite product produced by combining products of a plurality of types as a single product was developed (an example of a composite product being a so-called radio-cassette recorder that combines a radio and a cassette tape recorder), and so forth, it was necessary to newly create a function code for the developed product. Although, in a case where a new function code is set by one company, this code could be set without collaborating with other companies so as to preserve the secrecy of the new product under development, home network systems require standardization for new function codes and so forth between a plurality of companies that produces home electrical appliances. For this reason, the preservation of the secrecy of new products is difficult and collaboration with other companies is required, and, more particularly, has proved to be an important issue.

SUMMARY OF THE INVENTION

An object of the present invention is to provide a control device and control method that control home electrical appliances via a communication line by using function codes which are set without being specialized for specific home electrical appliances. It is a further object of the present invention to provide a home electrical appliance which is controlled by the control device via the communication line.

The above objects are achieved by a home electrical appliance control device that controls a home electrical appliance connected via a communication line. The home electrical appliance control device comprises: a memory section for storing a function table for mapping function identifiers, which identify function types allocated with the focus on the function itself to functions with which the home electrical appliance is equipped, with attributes of the functions; and a control section for controlling the home electrical appliance via the communication line on the basis of the function table. Further, from the perspective of grasping the built-in functions of a home electrical appliance, the control device generates built-in function information that associates the function identifier and the home electrical appliance when a built-in function notice is received from the home electrical appliance, and stores the built-in function information in the memory section, for example. Further, from the perspective of also observing the operating state of the home electrical appliance, the control section transmits the function identifier which corresponds to the function to be controlled together with information to the effect that an inquiry on the state of the function is to be performed to the home electrical appliance, for example. Alternatively, from the perspective of controlling the operating state of a specific home electrical appliance or simultaneously controlling the operating states of all the home electrical appliances which comprise the same function, the control section transmits the function identifier together with information including the set value for the function to the home electrical appliance(s) that correspond(s) to the function identifier which corresponds to the function to be controlled, for example.

Further, the above objects are achieved by a control method for a control device that controls a home electrical appliance connected via a communication line, wherein the control device is constituted so as to store a function table, which includes function identifiers that permit the control device and the home electrical appliance to commonly identify the types of functions with which the home electrical appliance is equipped, and attribute information for the functions; and built-in function information tables, which include built-in function information that indicates the functions built into each home electrical appliance and identification information that identifies the home electrical appliance; the control device specifies the function identifier of a certain function which is the control target from the function table; and the control device specifies home electrical appliance identification information that includes the specified function identifier, from the built-in function information tables. Further, in this control method, an inquiry on the state of a function of a home electrical appliance is made, and a home electrical appliance function is controlled as a result of being individually specified or by means of a broadcast transmission.

The control device and control method are such that the control device stores, in the memory section, a function table constituted on the basis of function identifiers allocated with the focus on the function itself to a plurality of functions. Therefore, when, without considering the type of the home electrical appliance which is the control target, the function to be controlled is specified, the function identifier can be determined by making reference to the function table.

In addition, the above object is achieved by means of a home electrical appliance that is connected via a communication line to a control device. The home electrical appliance comprises: a memory section for storing a built-in function table which is constituted by selecting a combination of function identifier and attributes in accordance with the functions of the home electrical appliance from a function table for mapping function identifiers that permit the control device and the home electrical appliance to commonly identify the types of functions allocated with the focus on the function itself to functions with which the home electrical appliance is equipped, with attributes of the functions; and a transmission section for transmitting a built-in function notice that includes a function identifier on the basis of the built-in function table, and access information that indicates the ability of the control device to control the function which corresponds to the function identifier, to the control device via the communication line.

Because the home electrical appliance constitutes a built-in function table which pertains to the built-in functions which the appliance itself is capable of executing from a function table constituted on the basis of function identifiers allocated with the focus on the function itself to a plurality of functions, when the control device determines the function to be controlled without considering the type of home electrical appliance which is the control target, the function identifier can be determined by making reference to the function table. In addition, when a new function is added to this home electrical appliance, because a built-in function table is constituted by selecting, from the function table, a combination of function identifier and attributes which corresponds to the new function, there is no need to newly allocate a function identifier, and hence the built-in function table can be easily constituted. For this reason, the preservation of new product secrecy is made possible, and there is also very little need to collaborate with other companies.

These and other objects, features, and advantages of the present invention will become more apparent upon reading the following detailed description along with the accompanying drawings.

BRIEF DESCRIPTION OF THE DRAWINGS

FIG. 4 shows an example of a function table according to the present embodiment;

FIGS. 5A–5D show respective examples of a built-in function table of home electrical appliances;

FIG. 6 shows a flowchart for a case where the controller recognizes a function of a home electrical appliance connected to the home network;

FIGS. 7A–7D show built-in function information tables;

FIG. 11 shows an example of a built-in function table of an air conditioner equipped with a smoke detection function;

FIG. 12 shows an example of a built-in function table for an air cleaner;

FIGS. 15A–15D show conventional built-in function tables.

DETAILED DESCRIPTION OF THE PREFERRED EMBODIMENTS

Figure 1:
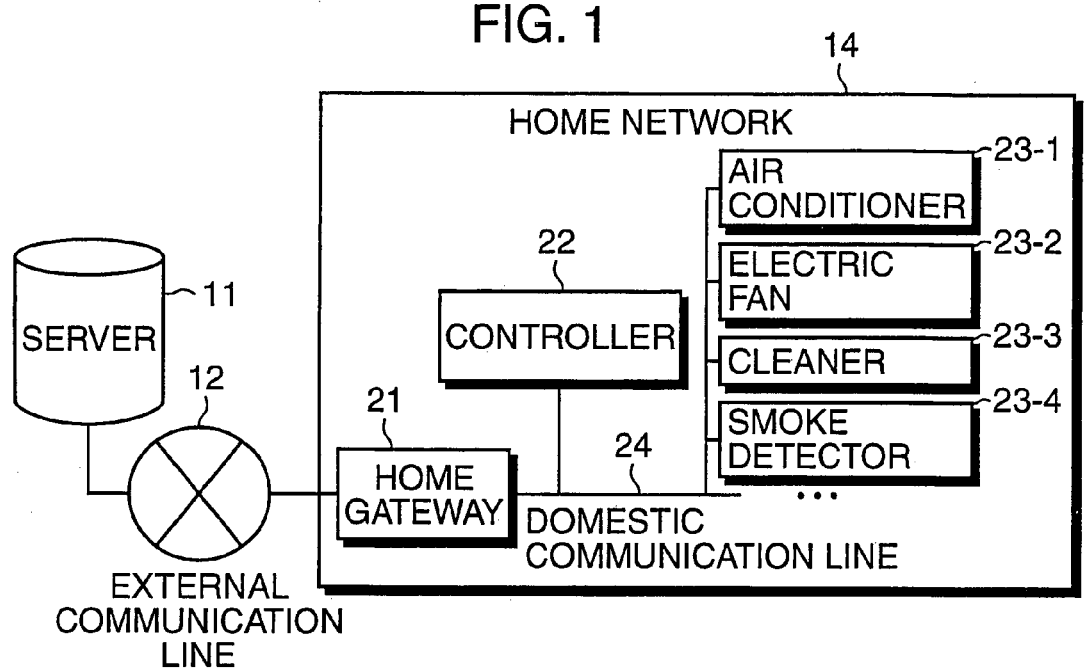
FIG. 1 shows the constitution of the home network system according to an embodiment of the present invention.

An embodiment of the present invention will be described below with reference to the drawings. Parts with the same constitution in the drawings have been assigned the same reference numerals and hence a description of such parts will be omitted here.

(Constitution of the Home Network System)

One feature of the present embodiment is that function codes are allocated with the focus on the function itself independently of the functions built into specific home electrical appliances, and the controller (control device) comprises a function table that groups together the function codes thus created, as well as built-in function tables which are created by selecting records from the function table in accordance with the functions built into the home electrical appliances. The home electrical appliance and controller according to the present invention will be described below.

Figure 2:
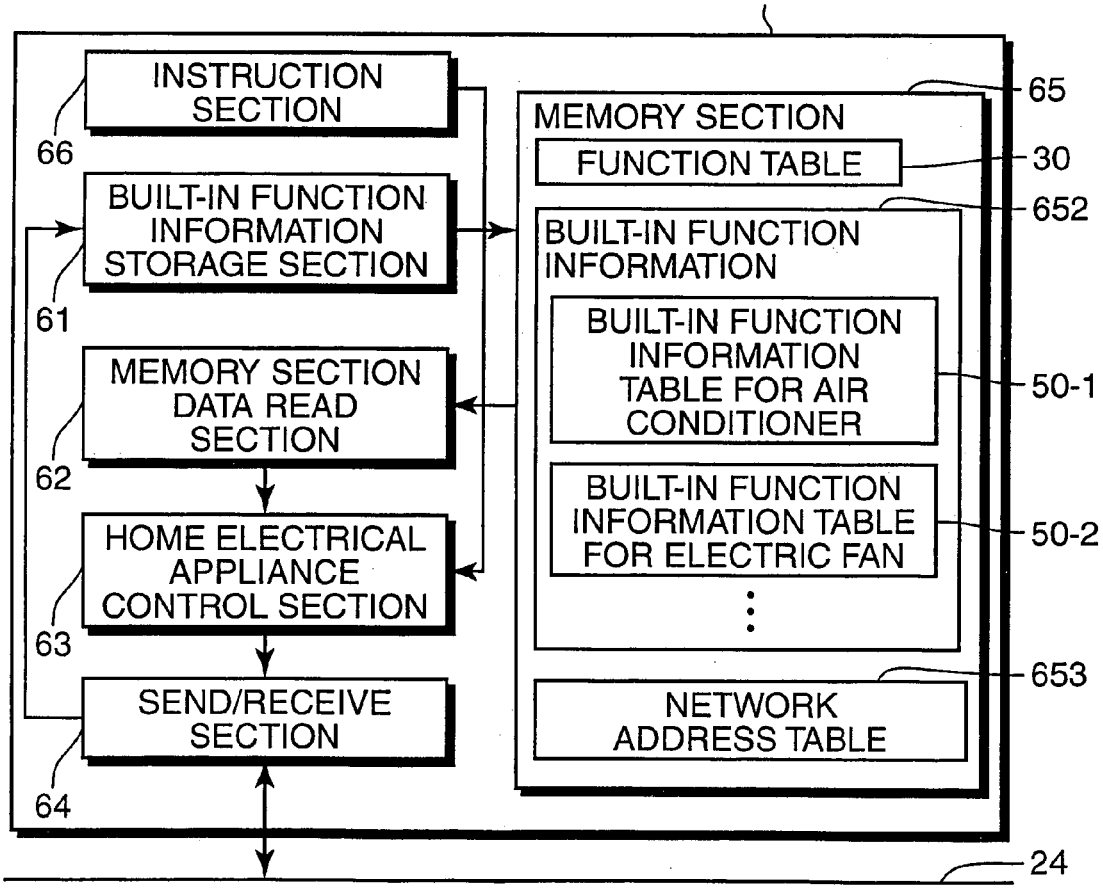
FIG. 2 shows the constitution of the controller.
Figure 3:
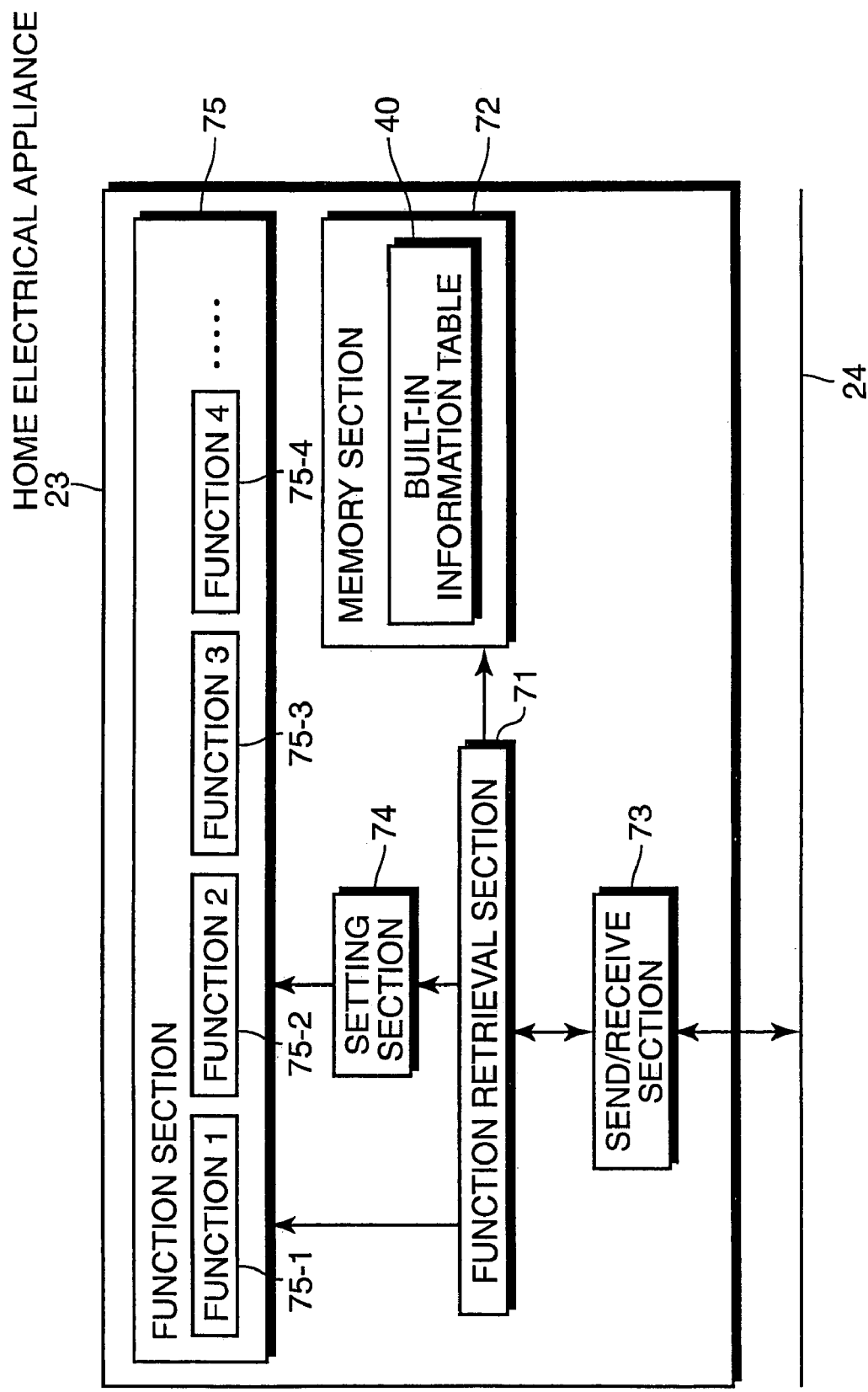
FIG. 3 shows the constitution of a home electrical appliance.

In FIGS. 1 to 3, the home network system is constituted as comprising a server 11, an external communication line 12 and a home network 14. The home network 14 is constituted as comprising a home gateway 21, a controller 22, home electrical appliances 23, and a domestic communication line 24.

The server 11 is a server computer that comprises, in a memory section, a database constituted by a function table 30 and built-in function tables 40, and so forth (which are described subsequently). In other words, the server 11 comprises: a memory section for storing a database, a program and various data generated during execution of the program, and the like; an input section (such as a keyboard and a mouse, for example) for inputting commands and data required to build the database, and the like; an output section (such as a display and a printer, for example) for outputting images and various data and the like to the outside; a communication interface which is an interface for communicating with devices connected to the external communication line 12 via the external communication line 12; and a processor for performing various processing such as control of the memory section, the input section, the output section, and the communication interface as well as the execution of a program. Moreover, depending on requirements, the server 11 further comprises an auxiliary storage device or an external memory device, or similar. Further, the server 11 transmits and receives information to and from the controller 22 and the home electrical appliances 23 in the home network 14, and, as a result of the processor executing the program, performs services and the like that provide information in the database to the controller 22 and the home electrical appliances 23 and so forth via the external communication line 12 in accordance with requests from the controller 22 and home electrical appliances 23 and so forth. The external communication line 12 is an external communication network constituted by a public switched line or a dedicated line such as a telephone line and digital line and the like.

The home gateway 21 is an interface that connects and enables communication between networks with completely different protocols. In other words, the home gateway 21 is disposed between the external communication line 12 and the domestic communication line 24, and, by adjusting the protocol between the home network 14 and the network outside the home network 14, communication is permitted therebetween.

In FIG. 2, the controller 22 is constituted as comprising a built-in function information storage section 61, a memory section data read section 62, a home electrical appliance control section 63, a send/receive section 64, a memory section 65, and an instruction section 66.

The built-in function information storage section 61 stores built-in function information on the home electrical appliances 23 which is received via the domestic communication line 24 and the send/receive section 64, and a variety of data that is generated during execution of the control program, and so forth, in the memory section 65. The memory section data read section 62 reads out the various data stored in the memory section 65 according to requirements, and outputs this data to the home electrical appliance control section 63. Based on the data from the memory section data read section 62, the home electrical appliance control section 63 generates control information for controlling the operating state of the home electrical appliances 23 connected to the domestic communication line 24 by means of a subsequently described operation, and outputs this control information to the send/receive section 64. The built-in function information storage section 61, memory section data read section 62 and home electrical appliance control section 63 are constituted as comprising a processor, for example. According to this constitution, the controller 22 is connected to the home gateway 21 and the home electrical appliances 23 via the domestic communication line 24 and manages the operating states of the home electrical appliances 23 by observing and controlling the home electrical appliances 23. The operating states are represented by the ON/OFF states of the home electrical appliances 23 themselves, the ON/OFF of the functions with which the home electrical appliances are equipped, and an adjustment of the function level and so forth. In addition, the controller 22 exchanges information with the server 11 via the domestic communication line 24, the home gateway 21, and the external communication line 12.

Furthermore, the send/receive section 64 is a communication interface for sending/receiving information to and from the server 11 and the home electrical appliances 23 and so forth via the external communication line 12 and the domestic communication line 24. In addition to storing a function table 30, a built-in function information 652 and a network address table 653, the memory section 65 stores a control program based on a flowchart (described subsequently), a variety of programs such as a communication program as well as data generated during execution of this variety of programs, and so forth. The memory section 65 is constituted as comprising memory such as a RAM (Random Access memory) and a ROM (Read Only Memory), for example. The network address table 653 is a list of addresses that specify each of the home electrical appliances that are connected to the home network 14. Further, the controller 22 may further comprise an external memory device such as a flexible disk drive and a CD-ROM drive and the like so that the control program may be installed from a storage medium such as a flexible disk, CD-ROM, and the like for storing the control program. The instruction section 66 is connected to the home electrical appliance control section 63 and the details of instructions by the user, such as the selection of a home electrical appliance 23 as a control target, are inputted to the controller 22. The instruction section 66 is a keyboard and a mouse, and the like, for example.

In FIG. 3, the home electrical appliance 23 is constituted as comprising a function retrieval section 71, a memory section 72, a send/receive section 73, a setting section 74, and a function section 75. The function retrieval section 71 is constituted by a microprocessor and the like, and is connected to the memory section 72, the send/receive section 73, the setting section 74, and the function section 75 such that these sections are controlled in a manner which will be described subsequently.

The memory section 72 stores a control program for controlling the function section 75, a variety of programs such as a communication program, data generated during execution of this variety of programs, a built-in information table 40 (described subsequently), and home network addresses that uniquely identify the home electrical appliances 23 within the home network 14. The send/receive section 73 is a communication interface for sending/receiving information to and from the server 11, the controller 22 and other home electrical appliances 23 via the external communication line 12 and the domestic communication line 24 and so forth.

The setting section 74 receives control information transmitted by the controller 22 via the domestic communication line 24, the send/receive section 73 and the function retrieval section 71, and the setting section 74 updates the set values of the functions of the function section 75 on the basis of this information. The function section 75 is a device component that executes the operation of the home electrical appliance 23, and the nature of this operation depends on the type of the home electrical appliance 23. For example, when the home electrical appliance 23 is an air conditioner, the functions of the function section 75 are an operation ON/OFF function, a ventilation amount adjustment function, a vented air temperature adjustment function, a vented air direction adjustment function, an ON timer function, and an OFF timer function and so forth. In the case of a cleaner, the functions of the function section 75 are an operation ON/OFF function and a cleaning level adjustment function and so forth.

According to this constitution, the home electrical appliances 23 perform, in addition to so-called home electrical appliance functions, a function to exchange management-related information with the controller 22 via the domestic communication line 24, and a function to exchange information with the server 11 via the domestic communication line 24, the home gateway 21, and the external communication line 12. The home electrical appliances 23 are, for example, an air conditioner 23-1, an electric fan 23-2, a cleaner 23-3, and a smoke detector 23-4, and the like, to which these information exchange functions have been added. The domestic communication line 24 is a domestic communication network constituted by a communication cable, an electric power line, and wireless or any other transmission media, and the domestic communication line 24 connects the home gateway 21, the controller 22 and the home electrical appliances 23 to one another.

In addition, the controller 22 is charged with controlling the operation of the home electrical appliances 23, and stores the function table 30 in the memory section 65 which the controller 22 comprises. In FIG. 4, each field of the function table 30 is constituted in accordance with a function code 31 and the attributes of the function. That is, the function table 30 comprises fields which are the function code 31, a function name 32, a function description 33, a data type 34, a size 35, and a value range 36.

The function code 31 is an identifier which is allocated to each function with the focus on the function itself in order to identify the type of a plurality of compiled functions which are not only functions that can be executed by a specific home electrical appliance 23 but which are general functions that can be executed by one or a plurality of home electrical appliances 23. For example, the functions of a plurality of home electrical appliances serving to regulate the air in the home, such as an air conditioner, an electric fan, a heater, a dehumidifier and a ventilation fan and so forth, are compiled, and a function code 31 is allocated to each function. Further, the functions of a plurality of housing equipment, such as an electronic locking door, motorized shutters, floor heating, bath water heater, and a smoke detector, for example, are compiled and a function code 31 is allocated to each function. Further, the functions of a plurality of audio-visual devices, such as a television, stereo, DVD and VCR, for example, are compiled and a function code 31 is allocated to these functions. Then, the functions of these pluralities of home electrical appliances, housing equipment, and audio-visual devices are compiled and a function code 31 is allocated to these functions. In addition, functions that are to be mounted in future home electrical appliances are assumed in addition to functions which are actually mounted in home electrical appliances already in the market place and a function code 31 may be allocated in advance to these assumed functions in order to adapt to a case where these functions are actually mounted in the future. Alternatively, function codes 31 may be allocated as reserves for future expansion. When a function is assumed and a function code 31 is allocated, the specific details, which are the function name 32, the function description 33, the data type 34, the size 35, and the value range 36, are stored in the fields of the function table 30. However, when function codes 31 are allocated as reserves, the specific details thereof are not stored in each field, and instead, specific symbols that represent blanks or reserves are stored in these fields.

Further, the records of the function table 30 are created for each of these function codes 31.

The function name 32 is a name for the function which corresponds to the function code 31. The function description 33 is a description of the function which corresponds to the function code 31. The data type 34 is a type of data for a control description that indicates to which state the function corresponding to the function code 31 is controlled. The size 35 is the data length of the control description which corresponds to the function code 31. The value range 36 is a numerical value range permitting setting of the control description which corresponds to the function code 31.

The function table 30 shown in FIG. 4 brings together, from a variety of home electrical appliances, functions such as a device operation setting, a ventilation amount setting, a vented air temperature setting, a vented air direction setting, an air purification setting, a cleaning level setting, a smoke detection setting, a current time setting, an ON timer setting and an OFF timer setting. In the case shown in FIG. 4, 01, 02, 03, 04, 05, 06, 07, 08, 09, 10, . . . are allocated as the function code 31 to these functions, and a record is created for each of these function codes 31. Further, a device operation setting, a ventilation amount setting, a vented air temperature setting, a vented air direction setting, an air purification setting, a cleaning level, a smoke detection state, a current time setting, an ON timer setting and an OFF timer setting, and so forth, are allocated to each of the function codes 31 in the respective fields for the function name 32. A device operation ON/OFF setting, a vented air amount level setting, a vented air temperature setting (° C.), a vented air directional swing setting, an air purification function operation setting, a cleaning level, a smoke detection state, a current time setting, a time setting for an ON operation, a time setting for an OFF operation, . . . are stored for each of the function codes 31 in the respective fields for the function description 33. "Unsigned char" is stored for all of the function codes 31 in the respective field for the data type 34. One byte is stored for the function codes 31=01 to 07 and two bytes are stored for the function codes 31=08 to 10, for each of the function codes 31 in the respective field for the size 35. "0:OFF, 1:ON", "0:OFF, 1 to 10:10 stage vented air amount, 0xFF:automatic", "0:OFF, 0 to 30", "0:OFF, 1:up and down, 2:left and right, 3:up and down, left and right", "0:OFF, 1:ON", "0:OFF, 1 to 5:5 stage cleaning level, 0xFF:automatic", "0:OFF, 1:ON", "0 to 23 (hours), 0 to 59 (minutes)", "0 to 23 (hours), 0 to 59 (minutes), 0xFFFF: OFF", "0 to 23(hours), 0 to 59(minutes)", 0xFFFF:OFF", . . . are stored for each of the function codes 31 in the respective field for the value range 36.

Meanwhile, the home electrical appliances 23 are charged with interpreting the control information received from the controller 22, and the home electrical appliances 23 store a built-in function table 40 in the memory section 72 contained therein. FIGS. 5A–5D show examples of a built-in function table of the home electrical appliances 23. In particular, FIG. 5A is an example of a built-in function table for an air conditioner, FIG. 5B is an example of a built-in function table for an electric fan, FIG. 5C is an example of a built-in function table for a cleaner, and FIG. 5D is an example of a built-in function table for a smoke detector.

In FIGS. 5A–5D, the built-in function tables 40 comprise fields for a function code 41, a function name 42, a function description 43, a data type 44, a size 45, a value range 46, and access information 47. The records of the built-in function tables 40 are created by means of a selection from the function table 30 on the basis of the functions which the home electrical appliances 23 can execute. Therefore, the function code 41, the function name 42, the function description 43, the data type 44, the size 45, and the value range 46 in the built-in function tables 40 respectively have the same meaning as the function code 31, the function name 32, the function description 33, the data type 34, the size 35, and the value range 36 in the above-described function table 30. The access information 47 indicates what kind of control that can be performed by the controller 22 with respect to the function which corresponds to the function code 41, such as "GET", "SET" and "ANNOUNCE", for example. "GET" indicates that the controller 22 is able to capture the value set for the function. "SET" indicates that the controller 22 is able to capture the value set for the function and that the controller 22 is able to set the value for the function. "ANNOUNCE" indicates that the controller 22 is able to capture the value set for the function and that the controller 22 is able to capture the value announced by the home electrical appliance.

Where the built-in function table 40-1 for the air conditioner is concerned, records are selected from the function table 30 in accordance with the functions actually built into the air conditioner 23-1, and, as shown in FIG. 5A, this table 40-1 is constituted by records for the function codes 41=01, 02, 03, 04, 05, 08, 09, 10. Where the built-in function table 40-2 for the electric fan is concerned, records are selected from the function table 30 in accordance with the functions actually built into the electric fan 23-2, and, as shown in FIG. 5B, this table 40-2 is constituted by records for the function codes 41=01, 02, 04, 08, 09, 10. Where the built-in function table 40-3 for the cleaner is concerned, records are selected from the function table 30 in accordance with the functions actually built into the cleaner 23-3, and, as shown in FIG. 5C, this table 40-3 is constituted by records for the function codes 41=01, 06. Where the built-in function table 40-4 for the smoke detector is concerned, records are selected from the function table 30 in accordance with the functions actually built into the smoke detector 23-4, and, as shown in FIG. 5D, this table 40-4 is constituted by records for the function codes 41=01, 07.

The built-in function tables 40 thus stored in the memory section 72 of the home electrical appliances 23 are selected and created from the function table 30 in accordance with the functions that are built into the home electrical appliances 23, and hence the same function code 41 in the home electrical appliances 23 is invariably the same function. Therefore, as will be described subsequently, when the controller 22 designates a specific function, it is possible to determine the function code 31 which corresponds to the specific function from the function table 30 alone, without considering the type of home electrical appliance as was the case conventionally.

Further, although a case where the access information 47 is not provided in the function table 30 was described in the above embodiment, access information may be provided in the function table 30.

(Operation of the Home Network System)

Next, the operation of the home network system according to the present embodiment will be described in the following order: 1) function recognition of the home network connected home electrical appliances 23 by the controller 22; 2) capture and setting of the operating states of the home electrical appliances 23; 3) simultaneous setting by means of a broadcast transmission; 4) co-operative control of the home electrical appliances 23.

1) Function Recognition of the Home Network Connected Home Electrical Appliances 23 by the Controller 22

In FIG. 6, in the case of this constitution, the microprocessor of the home electrical appliance 23 first uses the function retrieval section 71 to reference the built-in function codes 40 stored in the memory section 72 in order to generate a built-in function notice (S11-H) that comprises all the function codes 41, access information 47, and home network addresses that pertain to this home electrical appliance 23. The microprocessor then uses the send/receive section 73 to transmit the generated built-in function notice to the controller 22 via the domestic communication line 24 (S12-H) For example, when the home electrical appliance 23 is the air conditioner 23-1, according to the built-in function table 40-1 for the air conditioner of FIG. 5A, the built-in function notice of the air conditioner 23-1 is constituted as comprising 01, 02, 03, 04, 05, 08, 09, 10 as the function codes 41, "GET", "SET", "SET", "GET", "SET", "SET", "SET", "SET" as the corresponding access information 47, and home network addresses. Further, for example, in a case where the home electrical appliance 23 is the smoke detector 23-4, according to the built-in function table 40-4 for the smoke detector of FIG. 5D, the built-in function notice for the smoke detector 23-4 is constituted as comprising 01, 07 as the function codes 41, "SET" and "ANNOUNCE" as the corresponding access information 47, and home network addresses.

When the built-in function information storage section 61 of the controller 22 receives (S13-C) this built-in function notice via the domestic communication line 24 and the send/receive section 73, a built-in function information table associated with the home network addresses on this basis is created as built-in function information and stored in the memory section 65 in the controller 22 (S14-C). The built-in function information table is a table which is constituted such that the fields thereof comprise the function codes 41 and access information 47 and records are created for each of the function codes 41. The built-in information table also comprises an identification information field 48 for storing identification information that identifies the home electrical appliance 23. In this embodiment, the home network addresses of the home electrical appliances 23 are stored in the identification information field 48. FIGS. 7A–7D show examples of built-in function information tables. In particular, FIG. 7A shows a built-in function information table for an air conditioner, FIG. 7B shows a built-in function information table for an electric fan, FIG. 7C shows a built-in function information table for a cleaner, and FIG. 7D shows a built-in function information table for a smoke detector. In FIG. 7A, a built-in function information table 50-1 for an air conditioner is such that 01, 02, 03, 04, 05, 08, 09, 10 are registered for each record in the fields of the function codes 41, and "GET", "SET", "SET", "SET", "SET", "SET", "SET", "SET" are registered in the corresponding fields of the access information 47. In addition, the home network address of the air conditioner is registered in the identification information field 48. In FIG. 7B, a built-in function information table 50-2 for an electric fan is such that 01, 02, 04, 08, 09, 10 are registered for each record in the fields of the function codes 41, and "SET", "SET", "SET", "SET", "SET", "SET" are registered in the corresponding fields of the access information 47. In addition, the home network address of the electric fan is registered in the identification information field 48. In FIG. 7C, a built-in function information table 50-3 for a cleaner is such that 01 and 06 are registered for each record in the fields of the function codes 41, and "SET" and "GET" are registered in the corresponding fields of the access information 47. In addition, the home network address of the cleaner is registered in the identification information field 48. In FIG. 7D, a built-in function information table 50-4 for a smoke detector is such that 01 and 07 are registered for each record in the fields of the function codes 41, and "SET" and "ANNOUNCE" are registered in the corresponding fields of the access information 47. In addition, the home network address of the smoke detector is registered in the identification information field 48.

Figure 8:
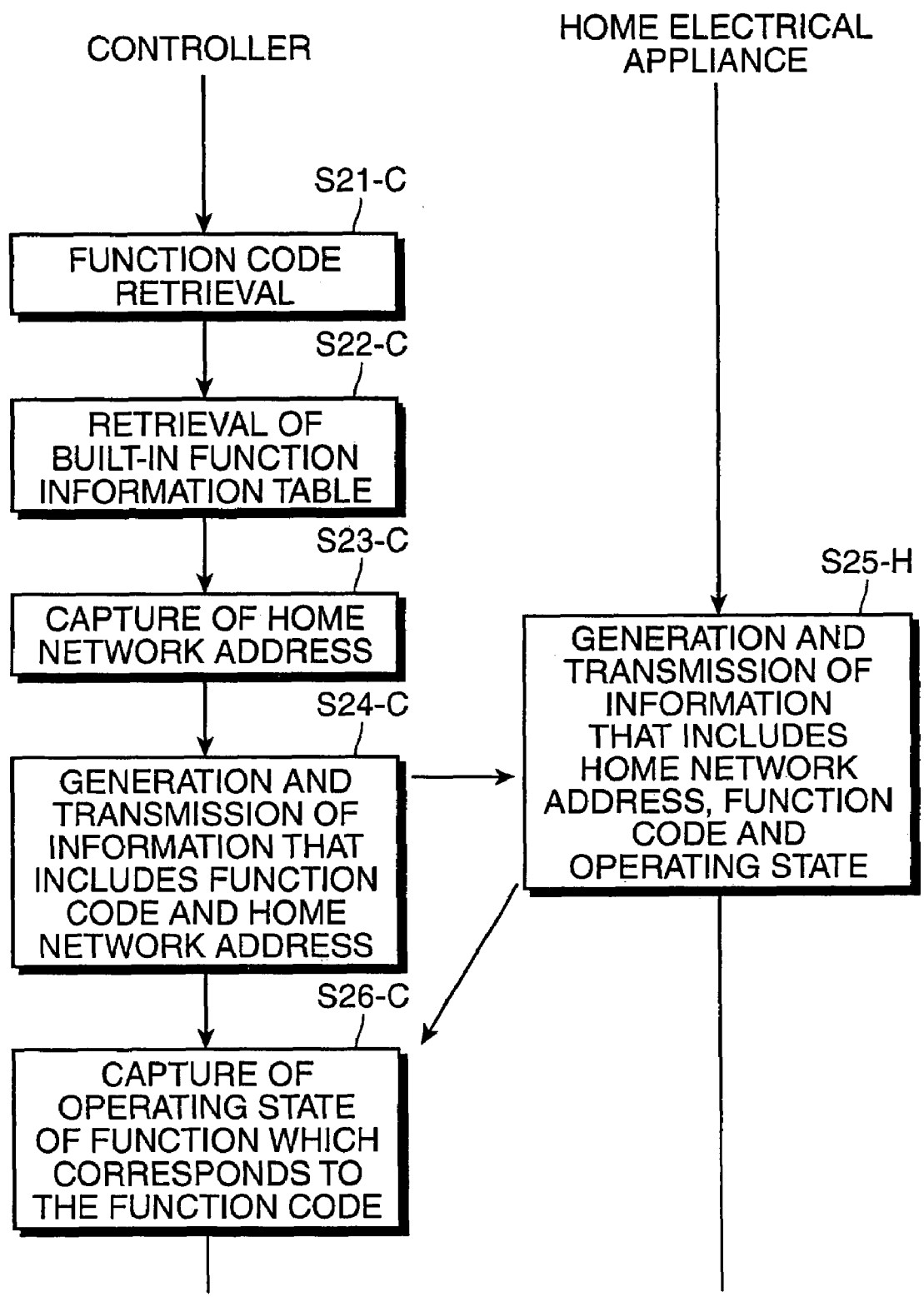
FIG. 8 shows a flowchart for a case where the controller captures the operating state of a home electrical appliance.

2) Capture and Setting of the Operating States of the Home Electrical Appliances In FIG. 8, in a case where the operating states of the home electrical appliances 23 are captured, the home electrical appliance control section 63 of the controller 22 uses the memory section data read section 62 and so forth to retrieve the function code 31 which corresponds to the function to be captured, from the function table 30 of the memory section 65 on the basis of the function name 32 of the function to be captured, for example (S21-C). Next, the home electrical appliance control section 63 of the controller 22 retrieves the built-in function information table 50 which has the retrieved function code 31 (S22-C) and obtains the home network address which corresponds to the home electrical appliance 23 in the built-in function information table 50 thus retrieved (S23-C). Next, the home electrical appliance control section 63 of the controller 22 generates information that includes the function code 31 of the search result according to which the home network address thus obtained is designated as the transmission destination, and transmits the generated information to the domestic communication line 24 by using the send/receive section 64 and so forth (S24-C).

Upon receiving this information, the microprocessor of the home electrical appliance 23 uses the function retrieval section 71 to generate information that designates the controller 22 as the transmission destination and that includes a value indicating the operating state of the function which corresponds to the function code 31, and the function code 31 of this function, and then uses the send/receive section 73 and so forth to transmit this information to the domestic communication line 24 (S25-H).

Upon receiving this information, the controller 22 captures the value that indicates the operating state of the function which corresponds to the function code 31 (S26-C).

As a result of this operation, the controller 22 is able to capture the operating state of the home electrical appliance 23.

Further, according to the present embodiment, although, from the perspective of enabling straightforward processing, an unaltered home network address is registered in the identification information field 48 as identification information that identifies the home electrical appliance 23, an ID and a name and the like that serve to identify the home electrical appliance could also be registered. In such a case, a table that shows the relationship between the ID and the home network address, for example, may be further provided in the memory section 65, such that, in S23-C, the ID may be obtained from the identification information field 48 of the built-in function information table 50 thus retrieved, and the home network address of the home electrical appliance 23 may be obtained by retrieving this table on the basis of an obtained ID.

Figure 9:
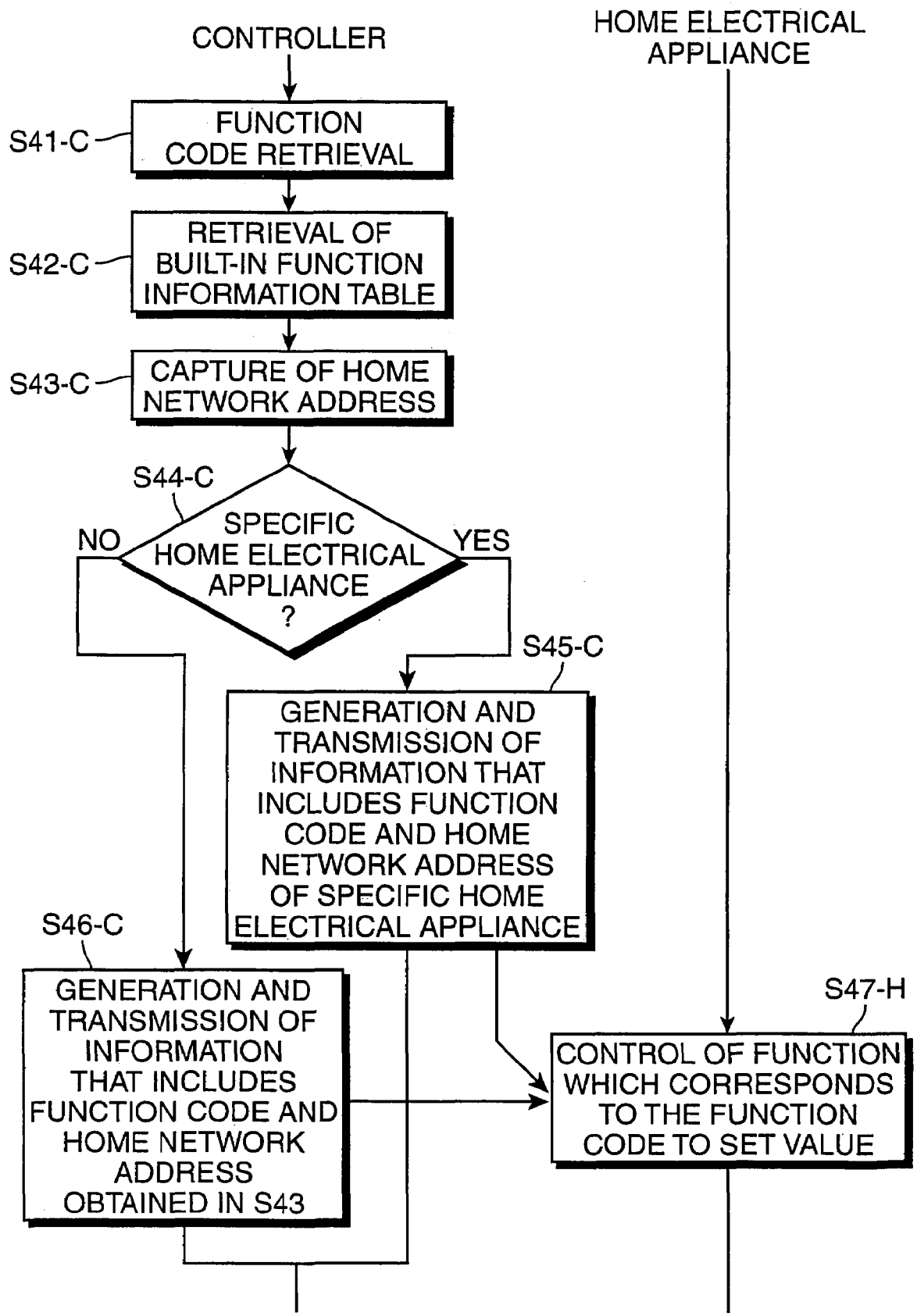
FIG. 9 shows a flowchart for a case where the controller sets the operating state of a home electrical appliance.

Further, in FIG. 9, when the operating state of the home electrical appliance 23 is set, the home electrical appliance control section 63 of the controller 22 uses the memory section data read section 62 and so forth to retrieve the function code 31 which corresponds to the function to be set, from the function table 30 of the memory section 65 (S41-C). Next, the home electrical appliance control section 63 of the controller 22 retrieves the built-in function information table 50 which has the retrieved function code 31 (S42-C) and thus obtains the home network address which corresponds to the home electrical appliance 23 of the retrieved built-in function information table 50 (S43-C). Next, the home electrical appliance control section 63 of the controller 22 causes the display section (not shown) of the controller 22 to display the obtained home network address, and allows the user to make an entry to specify whether a specific home electrical appliance 23 is the control target (S44-C). Thus, specific home electrical appliances 23 can be selected, and set values can be transmitted to all the target home network addresses. In a case where the user selects a specific home electrical appliance 23 by using the instruction section 66 of the controller 22, the home electrical appliance control section 63 of the controller 22 designates the home network address which corresponds to this specific home electrical appliance 23 as the transmission destination, generates information that includes the function code 31 of the search result and the set values, and transmits the generated information to the domestic communication line 24 by using the communication interface and so forth (S45-C). Meanwhile, in a case where a specific home electrical appliance 23 is not selected, the home electrical appliance control section 63 of the controller 22 designates the home network address obtained in S43-C as the transmission destination, generates information that includes the function code 31 of the search result and the set value, and transmits the information thus generated to the domestic communication line 24 by using the communication interface and so forth (S46-C).

For example, in a case where an ON timer setting is simultaneously set, the home electrical appliance control section 63 of the controller 22 judges that the ON timer setting function code 31=09 by retrieving the function code 31 which corresponds to the ON timer setting from the function table 30 of the memory section 65. Next, the home electrical appliance control section 63 of the controller 22 retrieves the built-in function information table 50 which has the function code 31=09 and thus obtains the home network address which corresponds to the home electrical appliance 23 of the retrieved built-in function information table 50. In this embodiment, as can be seen from FIG. 7, the built-in function information table 50-1 shown in FIG. 7A and the built-in function information table 50-2 shown in FIG. 7B include the function code 31=09. Thus, the home electrical appliance control section 63 of the controller 22 obtains a first home network address which corresponds to the built-in function information table 50-1 shown in FIG. 7A and a second home network address which corresponds to the built-in function information table 50-2 shown in FIG. 7B, and is thus able to recognize that the home electrical appliances 23 (the air conditioner 23-1 and the electric fan 23-2) which correspond to the first and second home network addresses respectively comprise an ON timer setting function. Further, in accordance with a user instruction, the home electrical appliance control section 63 of the controller 22 generates information that designates the first home network address as the transmission destination and includes the function code 31=09 and a set value, and information that designates the second home network address as the transmission destination and includes the function code 31=09 and a set value, and then transmits the information thus generated to the domestic communication line 24 by using the send/receive section 64 and the like.

Upon receiving this information, the respective function retrieval section 71 of the home electrical appliances 23 obtains the function code 31 and set value from the received information, and uses the setting section 74 to perform control such that the function which corresponds to the function code 31 thus obtained assumes the set value (S47-H). In the case described above, the setting section 74-1 of the air conditioner 23-1 sets the ON timer to the set value on the basis of the received information, and the setting section 74-2 of the electric fan 23-2 sets the ON timer to the set value on the basis of the received information.

As a result of this operation, because the function codes 31 are unified and do not depend on the home electrical appliances as described earlier, the home electrical appliance control section 63 of the controller 22 is able to retrieve the home electrical appliances 23 within the home network 14 which comprise the function to be set by retrieving the built-in function information tables 50 which include the function code 31 corresponding to the function to be set, and, in accordance with a user instruction, is able to set set values for the functions of these home electrical appliances 23.

Further, in a case where a home electrical appliance 23 whose operating state is to be set is specified, the home electrical appliance control section 63 of the controller 22 may generate information that designates the home network address of the home electrical appliance 23 as the transmission destination and includes the function code 31 of the search result and transmit this information to the domestic communication line 24.

3) Simultaneous Setting by Means of a Broadcast Transmission

Figure 10:
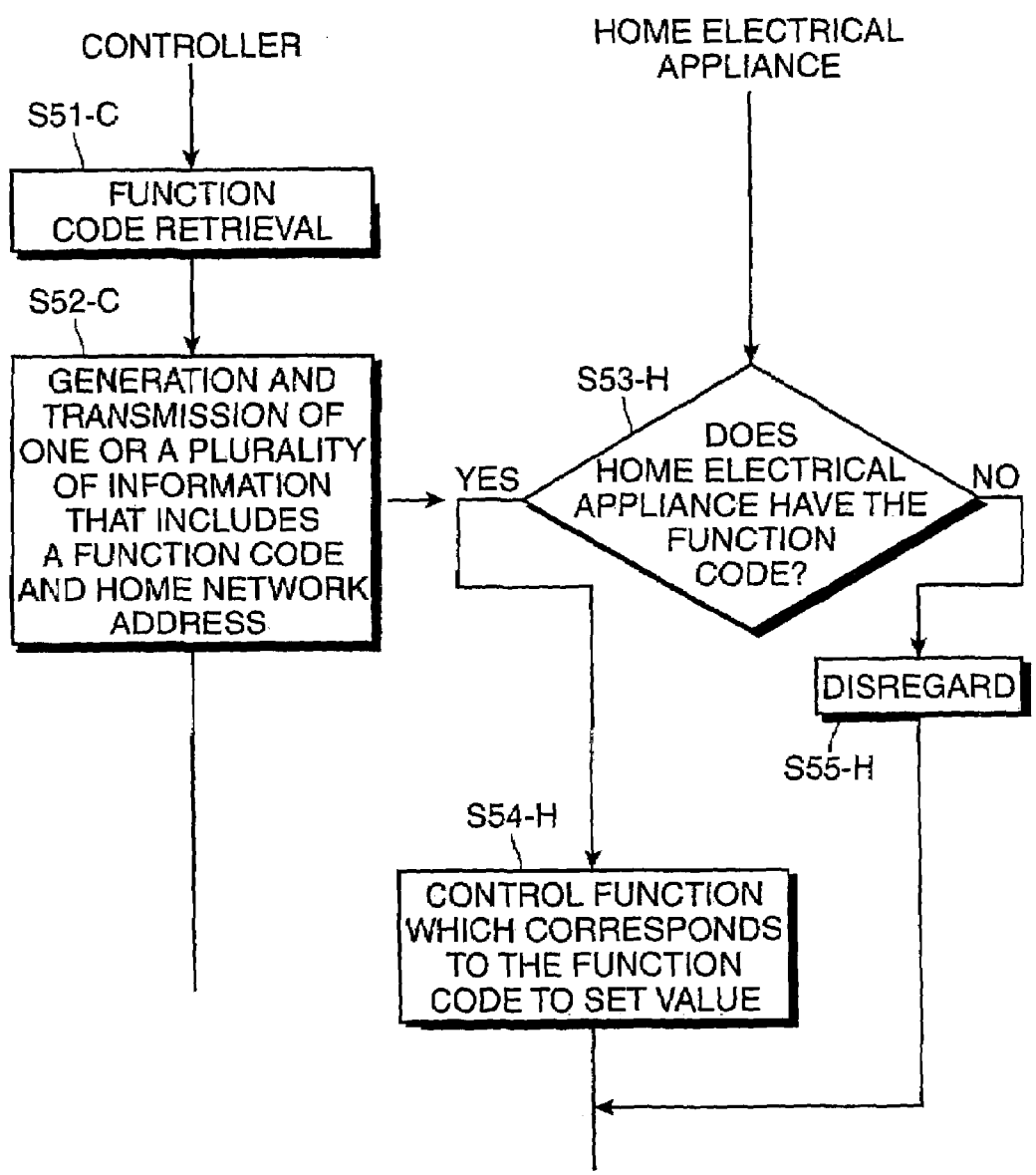
FIG. 10 shows a flowchart for a case where the controller sets home electrical appliances comprising the same function by means of a broadcast transmission.
Figures 13, 14:
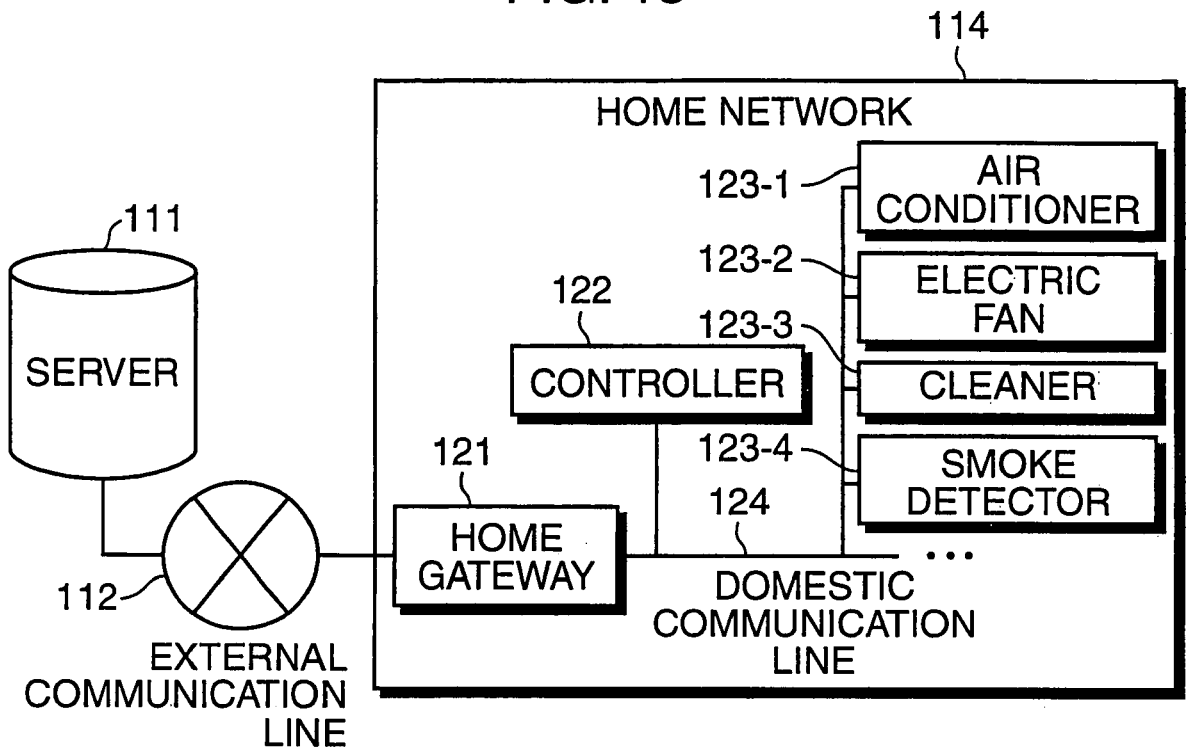
FIG. 13 shows the constitution of a conventional home network system.
FIG. 14 shows a conventional device code table.

In FIG. 10, in a case where the home electrical appliances 23 are set simultaneously by means of a broadcast transmission, the home electrical appliance control section 63 of the controller 22 uses the memory section data read section 62 and so forth to retrieve the function code 31 which corresponds to the function to be set from the function table 30 of the memory section 65 (S51-C). Next, the home electrical appliance control section 63 of the controller 22 uses a broadcast transmission address to generate information that includes the function code 31 of the search result and the set value, and then transmits the generated information to the domestic communication line 24 by using the communication interface and so forth (S52-C).

For example, in a case where the ON timer setting is simultaneously set by means of a broadcast transmission, the home electrical appliance control section 63 of the controller 22 judges that the function code 31 of the ON timer setting=09 by retrieving the function code 31 which corresponds to the ON timer setting from the function table 30 of the memory section 65. Next, the home electrical appliance control section 63 of the controller 22 uses the broadcast transmission address to generate information that includes function code 31=09 and the set value and then transmits the information thus generated to the domestic communication line 24 by using the send/receive section 64 and so forth.

Upon receiving this information, the function retrieval section 71 of the home electrical appliance 23 judges whether or not the function code 31=09 from the received information is included in the built-in function table 40 (S53-H). When the judgment result is that the function code 31=09 is included in the built-in function table 40, the setting section 74 updates the function to the set value (S54-H). On the other hand, when the judgment result is that the function code 31=09 is not included in the built-in function table 40, the setting section 74 disregards the received information (S55-H). In the above case, the setting section 74-1 of the air conditioner 23-1 updates the ON timer to the set value on the basis of the received information, and the setting section 74-2 of the electric fan 23-2 updates the ON timer to the set value on the basis of the received information.

As a result of this operation, because the function codes 31 are unified and do not depend on the home electrical appliances as described earlier, the home electrical appliance control section 63 of the controller 22 is able to set the set value simultaneously for the same function of the home electrical appliances 23 by making a broadcast transmission of information that includes the function code 31 which corresponds to the function to be simultaneously set, and the set value.

4) Co-Operative Control of the Home Electrical Appliances

There is sometimes a need to change the operating state of other home electrical appliances as a result of the operating state of a home electrical appliance for detecting the home environment. In such a case, because, according to the present invention, the function codes 31 are unified and do not depend on the home electrical appliances, it is possible to control the operating states by means of the co-operation of these home electrical appliances by means of the function codes 31 alone.

For example, there is sometimes a need to purify the air as a result of the home environment being impaired by smoke and so forth generated by tobacco and cooking and the like. In order to adapt to such a case, a program that sets the function code 31=05 to ON for all the home electrical appliances that comprise the function code 31=05 (air purification setting) when the function code 31=07 (smoke detection state) is turned ON, for example, is stored in the memory of the controller 22.

In such a case, the home electrical appliance control section 63 of the controller 22 captures the function state of the function code 31=09 of the home electrical appliances 23 in the home network 14 as a result of the operation described in 2) above or a notice from the home electrical appliances. In a case where the capture result is that the function state is ON, the home electrical appliance control section 63 of the controller 22 retrieves all of the home network addresses in the home network 14 for which the access information of the function for which the function code 31=05 comprises the SET function, and transmits the signal that sets the function for which the function code 31=05 to ON to the domestic communication line 24 with respect to the home network addresses, by means of the operations described in 2) and 3) above. As a result of receiving this signal, all of the home electrical appliances 23 pertaining to the home network addresses set the function for which the function code 31=05 to ON. Alternatively, a broadcast transmission can be made without designating home network addresses such that the function for which the function code 31=05 is set to ON as a result of the home electrical appliances 23 that have the function code 31=05 receiving this signal.

Thus, according to the present embodiment, because the function codes 31 are unified and do not depend on the home electrical appliances as described earlier and the home electrical appliances 23 are managed by means of home network addresses and built-in function information tables, it is possible to perform co-operative control of the operation of the home electrical appliances 23 by means of function association without an awareness of the types of the home electrical appliances 23.

(Addition of a New Function to an Existing Home Electrical Appliance and Development of a New Product)

Next, a case where a new function is added to an existing home electrical appliance and where a new product is developed will be described.

In a case where a new product B produced by adding a new function X to an existing home electrical appliance A is developed, when the new function X is already present in the function table 30, the function table 30 which the controller stores in memory does not need to be updated. On the other hand, a built-in function table for the new product B can be created by selecting a function code 31 for the new function X from the function table 30 and adding this function code 31 to an existing built-in function table 40. As a result, there is no need for collaboration with other companies. The secrecy of the new product B can therefore be preserved and it is possible to establish a competitive advantage prior to the launch of the new product B on the market. This case where a new function is added to an existing home electrical appliance is especially useful in situations where a composite product is newly developed and where a new function is offered as an option.

For example, in a case of developing a new product C, which is produced by adding a smoke detection function to an air conditioner, i.e. an air conditioner equipped with a smoke detection function (when a composite product constituted by an air conditioner and a smoke detector is developed), the built-in function table 40-5 of the new product C is constituted as comprising records for the function codes 41=01, 02, 03, 04, 05, 07, 08, 09, 10 as a result of adding the function code 31=07 for the smoke detection state which corresponds to the added function, as shown in FIG. 11. Further, until shipping takes place, the built-in function table 40-5 is stored in the memory of the new product C.

Further, for example, in a case where an air conditioner is developed together with a smoke detector that can be mounted on the air conditioner as an option, when the air conditioner is first sold wholesale with the built-in function table 40-1 in FIG. 5, for example, stored in the memory of the air conditioner up until shipping and a customer then purchases a smoke detector which is mounted on the air conditioner, the microprocessor of the air conditioner may download the built-in function table 40-5 in FIG. 11, for example, from the server 11.

Thus, because, according to the present invention, a function table is created by considering various functions and a built-in function table is created by means of selection from the function table, as per a case where a composite product is newly developed and where a customer is provided with an additional function as an option, for example, even in a case where a new function is added to an existing home electrical appliance, the function table 30 of the controller need not be updated and the built-in function table can be constituted easily. Further, because a built-in function table which corresponds with the newly added functions can be downloaded from the server, by putting a product that comprises only basic functions along with options for each additional function on the market, the customer is able to select additional functions in accordance with his or her needs. As a result, the present invention is able to closely match the budget and needs of the customer.

Here, in a case where a new product D is developed on the basis of a new concept, when various functions Y1, Y2, . . . , Yn of the new product D are present in the function table 30, the product D can, in effect, be regarded as a composite product, and therefore the process is the same as that described above.

For example, in a case where an air cleaner that has a smoke neutralizing function and a cleaning function is developed as product D on the basis of a new concept, the built-in function table 40-6 for product D is selected from the function table 30 in accordance with the various functions with which the new product D is equipped, and may be constituted as comprising records for the function codes 41=01, 05, 06, for example, as shown in FIG. 12.

Further, although the above embodiment detailed a case where shipping is made with the function table 30 pre-stored in the memory of the controller 22 and the built-in function table 40 pre-stored in the memory of the home electrical appliance 23, the function table 30 and the built-in function table 40 may be stored in the memory section of the server 11 so that these tables 30 and 40 may be downloaded via the external communication line 12 in accordance with a request from the controller 22 and the home electrical appliance 23 and so forth. The built-in function table 40 is specified by means of the name of the home electrical appliance manufacturer and the part number, for example. As a result of this download, when there is a change to the function table 30 and the built-in function table 40 and so forth, manufacturers are not required to adapt to adjustments to individual controllers 22 and home electrical appliances 23, and hence, adaptation can be performed rapidly and at low cost.

Further, although, in the above embodiment, a built-in function information table is stored in the memory of the controller 22 by transmitting the built-in function notice signal from the home electrical appliance 23 to the controller 22 via the domestic communication line 24, when a home electrical appliance 23 is connected to the domestic communication line 24, a signal that includes the manufacturer's own name and part number for the home electrical appliance 23 is transmitted to the controller 22, and therefore, as a result of the microprocessor of the controller 22 transmitting this signal that includes the manufacturer's name and part number to the server 11, the built-in function table 40 may be downloaded from the server 11. Alternatively, the home electrical appliance 23 may transmit a signal that includes the manufacturer's own name and part number for the home electrical appliance 23 to the server 11 and the built-in function table 40 may be transmitted from the server 11 to the controller 22.

Further, although, in the above embodiment, the value ranges 36 and 46 are also regulated in a unified manner, the value range 46 may be changed for every home electrical appliance 23. In this case, when the home electrical appliance 23 transmits the built-in function to the controller 22, the maximum and minimum values in the value range 46 are transmitted. As a result of this constitution, as per the case of an air conditioner that permits the setting of ventilation amounts up to three stages and an air conditioner that permits the setting of ventilation amounts up to six stages, the value range 46 can be set so as to precisely match the performance of individual home electrical appliances 23.

This application is based on Japanese patent application serial No. 2002-191776, filed in the Japanese Patent Office on Jul. 1, 2002, the contents of which are hereby incorporated by reference.

Although the present invention has been fully described by way of example with reference to the accompanying drawings, it is to be understood that various changes and modifications will be apparent to those skilled in the art. Therefore, unless such changes and modifications otherwise depart from the scope of the present invention hereinafter defined, they should be construed as being included therein.

The invention claimed is:

1. A home electrical appliance control device that controls a home electrical appliance connected via a communication line, said control device comprising:

a memory section for storing a function table for mapping function identifiers, which identify function types allocated to functions of the home electrical appliance based solely on the functions of the home electrical appliance regardless of kinds of home electrical appliances, with attributes of the functions; and a control section for controlling the home electrical appliance via the communication line on the basis of the function table.

2. The home electrical appliance control device according to claim 1, further comprising a storage section for generating built-in function information that associates the function identifier and the home electrical appliance on the basis of a built-in function notice, which includes a function identifier corresponding to a function of the home electrical appliance, received from the home electrical appliance, and for storing the received built-in function information in said memory section.

3. The home electrical appliance control device according to claim 2, wherein said control section is operable to retrieve the function identifier which corresponds to the function to be controlled from the function table and transmit the retrieved function identifier together with information that an inquiry on the state of the function is to be performed to the home electrical appliance which corresponds to the function identifier retrieved by making reference to the built-in function information.

4. The home electrical appliance control device according to claim 2, wherein said control section is operable to retrieve the function identifier which corresponds to the function to be controlled from the function table and transmit the function identifier together with information including a set value for the function to the home electrical appliance which corresponds to the function identifier retrieved by making reference to the built-in function information.

5. The home electrical appliance control device according to claim 1, wherein the attributes are at least one of:
   a function name, which is the name of the function which corresponds to the function identifier;
   a function description, which is a description of the function which corresponds to the function identifier;
   the data type of a control description that indicates an operating state of the function which corresponds to the function identifier;
   a size, which is a data length of the control description of the function which corresponds to the function identifier;
   a value range, which is a numerical value range permitting setting of the control description of the function which corresponds to the function identifier; and
   access information indicating controllability with respect to the function which corresponds to the function identifier.

6. A control method for a control device for controlling a home electrical appliance connected via a communication line,
   wherein said control method performed by the control device comprises:
      holding a function table, which includes function identifiers that permit the control device and the home electrical appliance to commonly identify the types of functions with which the home electrical appliance is equipped, and attribute information for the functions, and holding built-in function information tables, which include built-in function information that indicates the functions built into each home electrical appliance and identification information that identifies the home electrical appliance;
      specifying the function identifier of a certain function which is a control target from the function table; and
      specifying, from the built-in function information tables, home electrical appliance identification information that includes the specified function identifier.

7. The control method according to claim 6, further comprising inquiring a state of a function of a home electrical appliance constituting the control target on the basis of the specified function identifier and the specified home electrical appliance identification information.

8. The control method according to claim 6, further comprising transmitting the specified function identifier and setting information which is to be set for the function to the home electrical appliance which corresponds to the identification information to control the functions of the home electrical appliance.

9. The control method according to claim 8, further comprising:
   broadcasting the identification information to all of the home electrical appliances connected to the communication line; and
   updating the setting for the function identifier of the home electrical appliance to the received setting information when the home electrical appliance comprises a function which corresponds to the received function identifier.

10. A control program, stored on a computer-readable medium, for a control device for controlling a home electrical appliance connected via a communication line, said control program causing the control device to perform operations comprising:
    holding a function table, which includes function identifiers that permit the control device and the home electrical appliance to commonly identify the types of functions with which the home electrical appliance is equipped, and attribute information for the functions, and holding built-in function information tables, which include built-in function information that indicates the functions built into each home electrical appliance and identification information that identifies the home electrical appliance;
    specifying the function identifier of a certain function which is a control target from the function table; and
    specifying, from the built-in function information tables, home electrical appliance identification information that includes the specified function identifier.

11. A home electrical appliance that is connected via a communication line to a control device, said home electrical appliance comprising:
    a memory section for storing a built-in function table which is constituted by selecting a combination of a function identifier and attributes in accordance with the functions of the home electrical appliance from a function table for mapping function identifiers that permit the control device and said home electrical appliance to commonly identify the function types allocated, based solely on the functions of said home electrical appliance, to functions of said home electrical appliance regardless of kinds of home electrical appliances, with attributes of the functions; and
    a transmission section for transmitting, to the control device via the communication line, a built-in function notice that includes a function identifier on the basis of the built-in function table, and access information that indicates the ability of the control device to control the function which corresponds to the function identifier.

* * * * *